US010685225B2

(12) United States Patent  
Shanmugavel

(10) Patent No.: US 10,685,225 B2  
(45) Date of Patent: Jun. 16, 2020

(54) METHOD AND SYSTEM FOR DETECTING TEXT IN DIGITAL ENGINEERING DRAWINGS

(71) Applicant: Wipro Limited, Bangalore (IN)

(72) Inventor: Sibi Chakravarthy Shanmugavel, Dindigul (IN)

(73) Assignee: Wipro Limited, Bangalore (IN)

( * ) Notice: Subject to any disclaimer, the term of this patent is extended or adjusted under 35 U.S.C. 154(b) by 93 days.

(21) Appl. No.: 15/900,092

(22) Filed: Feb. 20, 2018

(65) Prior Publication Data

US 2019/0205637 A1      Jul. 4, 2019

(30) Foreign Application Priority Data

Dec. 29, 2017    (IN) .............................. 201741047357

(51) Int. Cl.
*G06K 9/00*           (2006.01)

(52) U.S. Cl.
CPC ..... *G06K 9/00463* (2013.01); *G06K 9/00476* (2013.01)

(58) Field of Classification Search
CPC ................. G06K 9/00463; G06K 9/00476
See application file for complete search history.

(56) References Cited

U.S. PATENT DOCUMENTS

| | | | | |
|---|---|---|---|---|
| 5,680,478 A * | 10/1997 | Wang | ................ | G06K 9/00456 382/171 |
| 5,995,659 A * | 11/1999 | Chakraborty | ...... | G06K 9/00456 382/176 |
| 8,837,830 B2 | 9/2014 | Bala et al. | | |
| 9,224,061 B1 | 12/2015 | Natarajan et al. | | |
| 2006/0294460 A1 * | 12/2006 | Chao | ..................... | G06F 40/103 715/209 |
| 2010/0220929 A1 * | 9/2010 | Misawa | .................. | G06F 16/54 382/190 |

OTHER PUBLICATIONS

Lu, "Detection of Text Regions From Digital Engineering Drawings", Journal, Apr. 1998, 9 pages, vol. 20, Issue 4, IEEE.
Fletcher et al., "A Robust Algorithm for Text String Separation From Mixed Text/Graphics Images", Journal, Nov. 1988, 9 pages, vol. 10, Issue 6, IEEE.

* cited by examiner

*Primary Examiner* — John W Lee
(74) *Attorney, Agent, or Firm* — Finnegan, Henderson, Farabow, Garrett & Dunner, LLP

(57) ABSTRACT

The present disclosure discloses method and text detection system for detecting text in digital engineering drawings. The text detection system receives digital engineering drawing, where digital image is converted to binary image. One or more lines inclined at one or more angles are detected based on pre-defined parameters, where one or more lines are removed from binary image. The text detection system determines image contours in binary image based on connected pixels with similar characteristics and identify one or more regions in binary image, to be non-text regions based on height, width, and pixel density, of corresponding image contours and predefined minimum height, minimum width, maximum height, maximum width, and predefined pixel density, where non-text regions are removed from binary image. The text detection system determines text regions in binary image based on removal of non-text regions and processing text regions to detect text in binary image of engineering drawing.

12 Claims, 7 Drawing Sheets

METHOD AND SYSTEM FOR DETECTING TEXT IN DIGITAL ENGINEERING DRAWINGS

This application claims the benefit of Indian Patent Application Serial No. 201741047357, filed Dec. 29, 2017, which is hereby incorporated by reference in its entirety.

FIELD

The present subject matter is related in general to the field of image processing, more particularly, but not exclusively to method and system for detecting text in digital engineering drawings.

BACKGROUND

Presently various types of structured documents are widely used in different engineering fields, which creates a commercial demand for automatic knowledge extraction or for interpretation systems to reuse previous drawing contents. Engineering table drawings are one such type of structured documents which represent structured knowledge in a compact and efficient way. As a result, automatic knowledge extraction or interpretation of engineering table drawings has been an important topic in document analysis today.

Currently, most available text detection methods cannot be used reliably for engineering drawings. One common approach for text detection in image is a stroke width transform. The stroke width transform works on a principle that text in images have constant stroke and non-text regions have non-uniform stroke width. However, in case of digital engineering drawing, both text and non-text regions have constant stroke. Therefore, the stroke width transform is unable to differentiate between text and non-text components.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for detecting text in digital engineering drawings. The method comprises receiving a digital image of an engineering drawing. The digital image is converted to a binary image. The method comprises detecting one or more lines inclined at one or more angles, in the binary image, based on pre-defined parameters. The one or more lines are removed from the binary image. The method comprises determining one or more image contours in the binary image based on connected pixels with similar characteristics, identifying one or more regions in the binary image, to be non-text regions based on a height, a width, and a pixel density, of corresponding one or more image contours and a predefined minimum height, minimum width, maximum height, maximum width, and a predefined pixel density. The one or more non-text regions are removed from the binary image. The method comprises determining one or more text regions in the binary image based on the removal of the one or more non-text regions and processing the one or more text regions to detect text in the binary image of the engineering drawing.

In an embodiment, the present disclosure may relate to a text detection system for detecting text in digital engineering drawings. The text detection system may comprise a processor and a memory communicatively coupled to the processor, where the memory stores processor executable instructions, which, on execution, may cause text detection system to receive a digital image of an engineering drawing. The digital image is converted to a binary image. The text detection system detects one or more lines inclined at one or more angles, in the binary image, based on pre-defined parameters. The one or more lines are removed from the binary image. The text detection system determines one or more image contours in the binary image based on connected pixels with similar characteristics, identifies one or more regions in the binary image, to be non-text regions based on a height, a width, and a pixel density, of corresponding one or more image contours and a predefined minimum height, minimum width, maximum height, maximum width, and a predefined pixel density. The one or more non-text regions are removed from the binary image. The text detection system determines one or more text regions in the binary image based on the removal of the one or more non-text regions and processes the one or more text regions to detect text in the binary image of the engineering drawing.

In an embodiment, the present disclosure relates to a non-transitory computer readable medium including instructions stored thereon that when processed by at least one processor may cause a text detection system to receive a digital image of an engineering drawing. The digital image is converted to a binary image. The instruction causes the processor to detect one or more lines inclined at one or more angles, in the binary image, based on pre-defined parameters. The one or more lines are removed from the binary image. The instruction causes the processor to determine one or more image contours in the binary image based on connected pixels with similar characteristics, identifies one or more regions in the binary image, to be non-text regions based on a height, a width, and a pixel density, of corresponding one or more image contours and a predefined minimum height, minimum width, maximum height, maximum width, and a predefined pixel density. The one or more non-text regions are removed from the binary image. The instruction causes the processor to determine one or more text regions in the binary image based on the removal of the one or more non-text regions and processes the one or more text regions to detect text in the binary image of the engineering drawing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
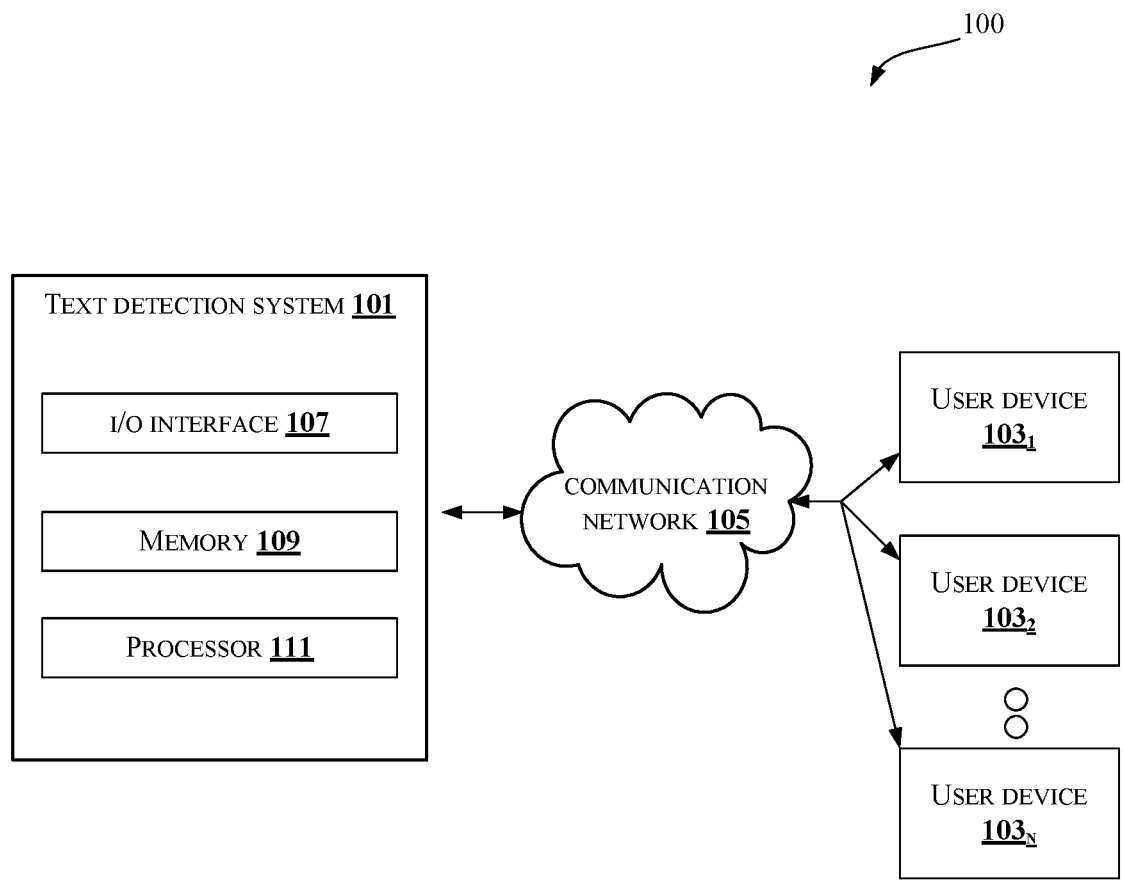
FIG. 1 illustrates an exemplary environment for detecting text in digital engineering drawings in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a text detection system for detecting text in digital engineering drawings. The text detection system may convert a digital engineering drawing to a binary image, whenever any digital engineering drawing is received from user devices. Lines at one or more inclined angles may be removed from the converted binary image and image contours are determined based on connected pixels with similar characteristics in the binary image. Non-text regions may be identified in the converted binary image and text regions may be determined based on the removal of the non-text regions. Text may be detected by processing the text regions using predefined techniques. The present disclosure ensures an easy text detection technique in complex engineering drawings.

FIG. 1 illustrates an exemplary environment for detecting text in digital engineering drawings in accordance with some embodiments of the present disclosure. As shown in FIG. 1, the environment 100 includes a text detection system 101 connected through a communication network 105 to a user device 1031, a user device 1032, . . . and a user device 103N (collectively referred as user devices 103) associated with users. In an embodiment, the digital engineering drawing may refer to a technical drawing, drawn on a computing system which is used to define requirements fully and clearly for engineered items. In an embodiment, the user devices 103 may include, but are not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used in the present disclosure. Further, the communication network 105 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The text detection system 101 may facilitate easy text detection in digital engineering drawings.

The text detection system 101 may convert a digital engineering drawing to a binary image, whenever any digital engineering drawing is received from the user devices 103. In an embodiment, the text detection system 101 may include, but is not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used as text detection system 101 in the present disclosure. The text detection system 101 may detect one or more lines inclined at one or more angles in the binary image using pre-defined parameters. In an embodiment, the pre-defined parameters comprise distance resolution between two lines, angle resolution of lines passing through a point, number of points passing through a line, and minimum length for the line. A person skilled in the art would understand that any other parameter for detecting lines, not mentioned explicitly, may also be used in the present disclosure. In an embodiment, the one or more lines may be detected using probabilistic hough transfer technique. A person skilled in the art would understand that any other technique for detecting lines, not mentioned explicitly, may also be used in the present disclosure. The one or more lines detected in the binary image may be removed. The text detection system 101 may determine one or more image contours from the binary image, which may be free from one or more lines. The one or more image contours may be determined using connected pixels in the binary image with similar characteristics. Further, the text detection system 101 may identify one or more non-text regions in the binary image based on the one or more image contours. In an embodiment, the one or more non-text region may be identified by detecting a height of the one or more image contour to be one of, greater than a predefined maximum height and lesser than a predefined minimum height, the width of the one or more image contours to be one of greater than a predefined maximum width and lesser than a predefined minimum width and a pixel density of the one or more image contours to be greater than the predefined pixel density. In an embodiment, the pixel density is a ratio of the number of white pixels and product of contour width and height. The text detection system 101 may remove the one or more non-text regions from the binary image. Further, the text detection system 101 may determine one or more text regions in the binary image, which may be free from the one or more non-text regions and process the one or more text regions to detect text in the binary image of the digital engineering drawing. In an embodiment, the one or more text regions may be processed by converting the binary image to an eroded image using connected component analysis technique. Further, in the eroded image, a block of text may be identified, based on a predefined maximum height and maximum width and a predefined minimum height and minimum width of image contours in the eroded image. The text from the block of text may be detected using an Optical Character Recognition (OCR) technique. A person skilled in the art would understand that any other technique for detecting text from block, not mentioned explicitly, may also be used in the present disclosure.

The text detection system 101 may include an I/O Interface 107, a memory 109 and a processor 111. The I/O interface 107 may be configured to receive the digital engineering drawings from the user devices 103. The I/O interface 107 may provide the text detected in the binary image corresponding to the digital engineering drawing to the user devices 103.

The information received from the I/O interface 107 may be stored in the memory 109. The memory 109 may be communicatively coupled to the processor 111 of the text detection system 101. The memory 109 may also store processor instructions which may cause the processor 111 to execute the instructions for detecting text in digital engineering drawings.

Figure 2:
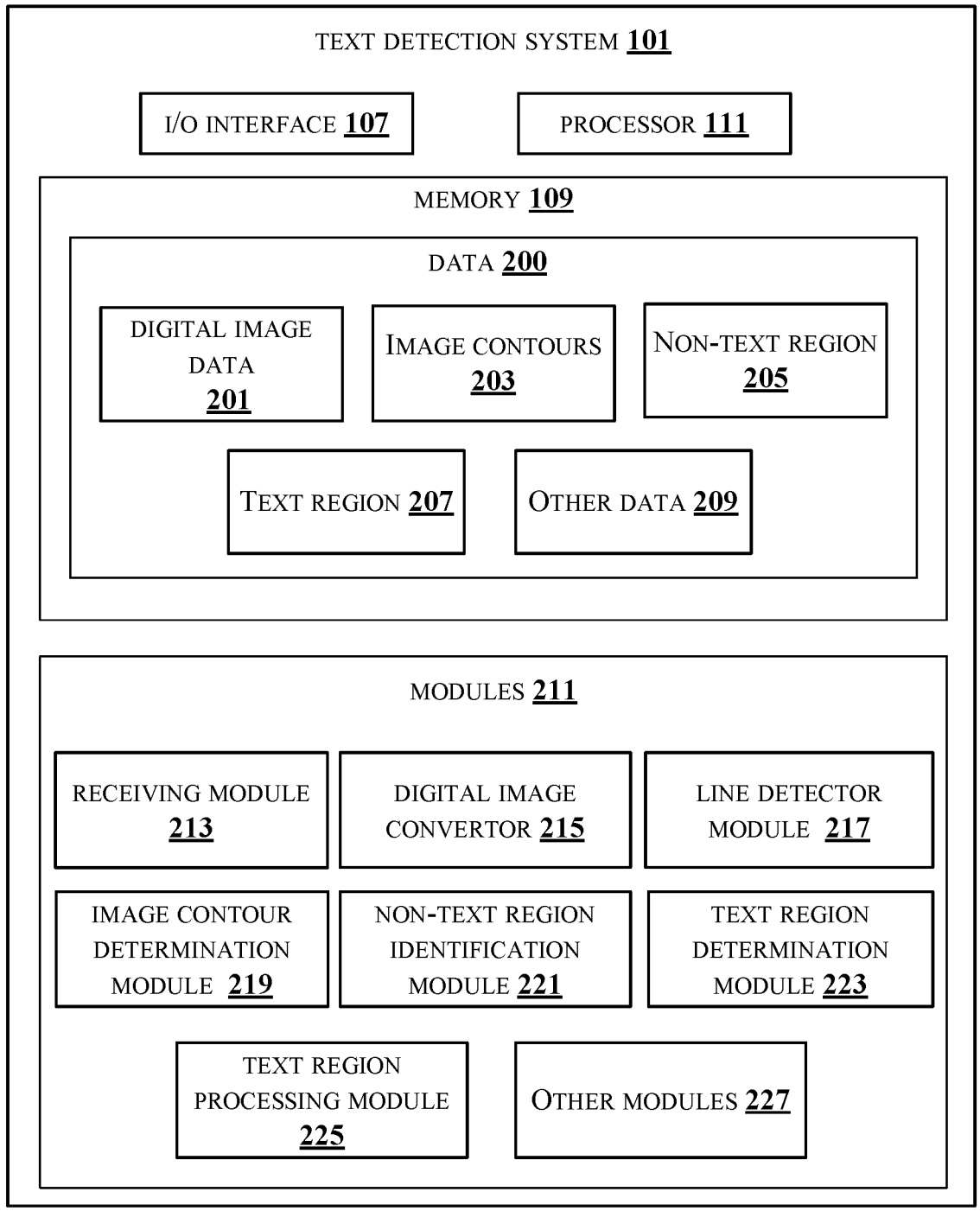
FIG. 2 shows a detailed block diagram of a text detection system in accordance with some embodiments of the present disclosure.

FIG. 2 shows a detailed block diagram of a text detection system in accordance with some embodiments of the present disclosure.

Data 200 and one or more modules 211 of the text detection system 101 are described herein in detail. In an embodiment, the data 200 may include digital image data 201, image contours 203, non-text region 205, text region 207 and other data 209.

The digital image data 201 may include details associated with the digital engineering drawing received from the user devices 103. The details may include type of the engineering drawing and pixel details associated with the digital engineering drawing.

The image contours 203 may include information regarding one or more image contours 203 determined in the binary image of the digital engineering drawing. In an embodiment, the pixels in the binary image with a common label may be considered as the image contours 203. The image contours 203 may include pixel details associated with each type of image contours.

The non-text region 205 may include details associated with the one or more regions which may be identified as non-text region in the binary image of the digital engineering drawings. The details may include pixel data, height and width of the one or more image contours in the one or more regions which may be identified as the non-text regions. In an embodiment, the non-text region 205 may include the one or more regions in the binary image which do not include any text.

The text region 207 may include details associated with the one or more regions which may be determined as text regions in the binary image of the digital engineering drawings. The details may include pixel data, height and width of the one or more image contours present in the one or more regions which may be identified as the text region. In an embodiment, the text region 207 may include the one or more regions in the binary image which contains text.

The other data 209 may store data, including temporary data and temporary files, generated by modules 211 for performing the various functions of the text detection system 101.

In an embodiment, the data 200 in the memory 109 are processed by the one or more modules 211 of the text detection system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 211 when configured with the functionality defined in the present disclosure will result in a novel hardware.

In one implementation, the one or more modules 211 may include, but are not limited to a receiving module 213, a digital image converter 215, a line detector module 217, an image contour determination module 219, a non-text region identification module 221, a text region determination module 223 and a text region processing module 225. The one or more modules 211 may also include other modules 227 to perform various miscellaneous functionalities of the text detection system 101. In an embodiment, the other modules 227 may include a line removal module for removing the detected lines and a non-text region removal module for removing the non-text region identified.

Figure 3A:
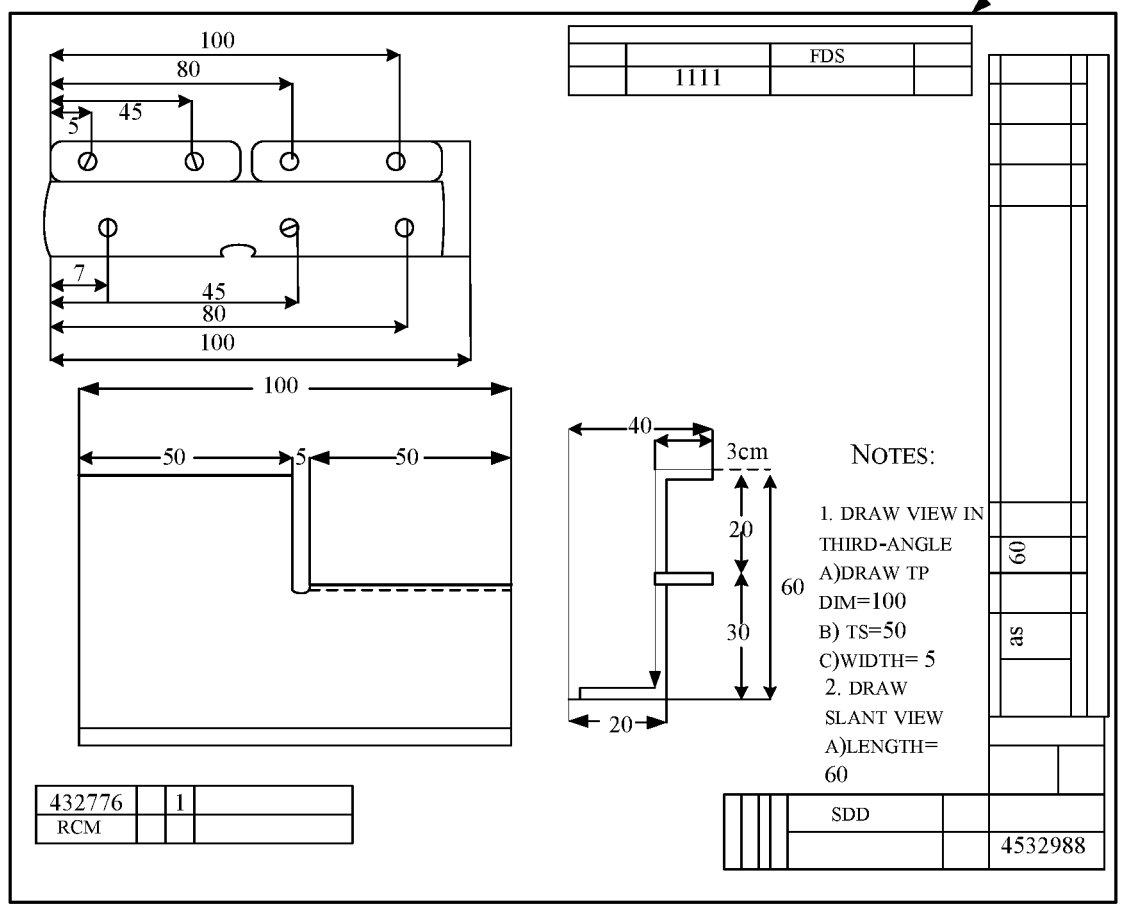
FIG. 3a shows an exemplary representation of a digital engineering drawing in accordance with some embodiments of the present disclosure.

The receiving module 213 may receive the digital engineering drawing from the user devices 103. FIG. 3a shows an exemplary representation of a digital engineering drawing in accordance with some embodiments of the present disclosure. As shown in FIG. 3a, the engineering drawing 301 comprises the drawing along with notes.

The digital image converter 215 may convert the digital engineering drawing received from the user devices 103 to the binary image. In an embodiment, the digital engineering drawing may contain different shades of black and gray. The digital image converter 215 may binarize the engineering drawing such that the digital engineering drawing is represented with two-pixel colors black (0) and white (255). Further, the digital image converter 215 may convert pixels of one or more lines detected by the line detector module 217 to black color in binary format.

Figure 3B:
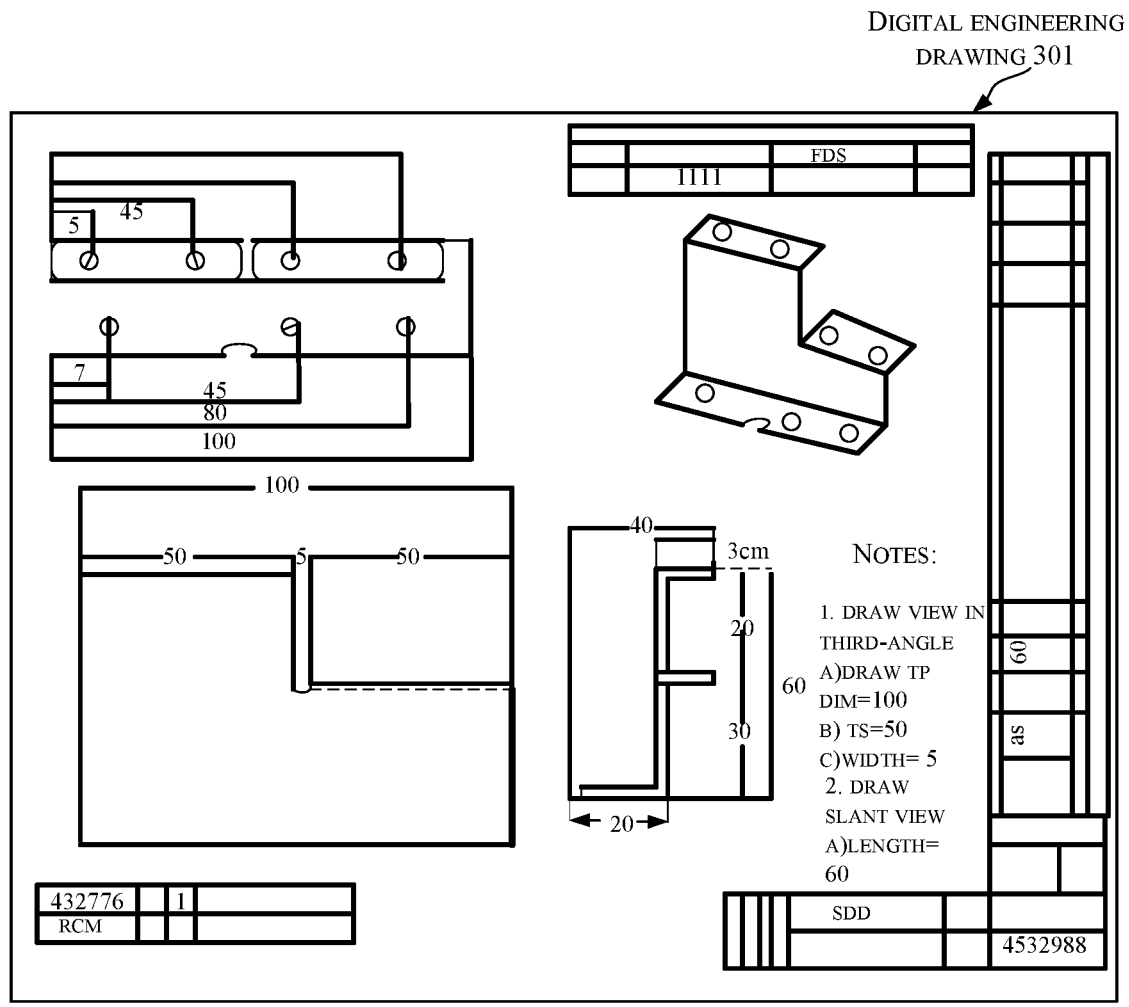
FIG. 3b shows an exemplary representation for detecting lines in a digital engineering drawing in accordance with some embodiments of present disclosure.

The line detector module 217 may detect one or more lines inclined at one or more angles in the digital engineering drawing. The line detector module 217 may detect the one or more lines based on pre-defined parameters. In an embodiment, the pre-defined parameters may include distance resolution between two lines, angle resolution of lines passing through a point, number of points passing through a line, and minimum length for the line. In an embodiment, the line detector module 217 may use probabilistic hough transfer technique to detect the one or more lines in the digital engineering drawing. The probabilistic hough transfer technique is an optimization of hough transform technique which takes only a random subset of points for detecting the one or more lines. Further, the line detector module 217 may remove the one or more lines detected from the binary image, once the binary image is inverted to a standard black and white gray image version. FIG. 3b shows an exemplary representation for detecting lines in a digital engineering drawing in accordance with some embodiments of present disclosure. FIG. 3b shows the digital engineering drawing 301 and the one or more lines which are detected by the line detector module 217. The one or more highlighted lines in the engineering drawing 301 are detected by the line detector module 217, and removed from the engineering drawing 301.

The image contour determination module 219 may determine the one or more image contours in the digital engineering drawing based on connected pixels with similar characteristics. In an embodiment, the image contour determination module 219 may receive the binary images from which one or more lines may be removed. In an embodiment, the image contour determination module 219 may use any one of a connected component labelling also referred as connected component analysis, blob extraction, region labeling, blob discovery or region extraction and the like which are techniques where subsets of connected components are uniquely labelled based on a given heuristic. In an embodiment, in the connected component analysis, black pixels are given a common label. After the entire component analysis is performed, pixels with a common label are considered to refer to a single component. The components in which the pixels share a common label are called as image contours. In an embodiment, the connected component analysis depends on the kernel size used on this morphological operation. Further, the image contour determination module 219 may determine the width, the height and the pixel density associated with each of the one or more image contours.

The non-text region identification module 221 may identify one or more regions in the binary image as non-text regions. The non-text identification module 221 may identify the non-text regions based on the height, the width, and the pixel density of one or more image contours and a predefined minimum height, minimum width, maximum height, maximum width, and the predefined pixel density.

The non-text region identification module 221 may compare the height of the one or more image contours in the binary image with the predefined maximum height and the predefined minimum height. The width of the one or more image contours may be compared with the predefined maximum width and the predefined minimum width. The non-text region identification module 221 may identify the one or more regions as non-text regions in case, if the height of the one or more image contour corresponding to the one or more regions is either greater than a predefined maximum height or lesser than the predefined minimum height. Equation (1) represents this condition below.

$$\text{Minimum width} <= \text{Contour width} <= \text{Maximum width} \quad (1)$$

Similarly, if the width of the one or more image contours is either greater than the predefined maximum width or lesser than the predefined minimum width, the non-text region identification module 221 may identify the one or more regions as the non-text region. This condition is represented in below equation 2. In an embodiment, using the minimum threshold value for width and height, dots, commas, semi-colons etc., may be removed from the binary image.

$$\text{Minimum height} <= \text{Contour height} <= \text{Maximum height} \quad (2)$$

Further, the non-text region identification module 221 may compare the pixel density of the image contours with the predefined pixel density. In case, the pixel density of the one or more image contours is greater than the predefined pixel density, the non-text region identification module 221 may identify the image contours as non-text regions. In an embodiment, the pixel density is the ratio of the number of white pixels and product of contour width and height. Equation (3) represents this condition below. The non-text region identification module 221 may remove the one or more non-text regions from the binary image.

$$\text{Pixel density} = (\text{No of white pixels}) / ((\text{width of contour})(\text{height of contour})) \quad (3)$$

The text region determination module 223 may determine one or more text regions in the digital engineering drawing. The text region determination module 223 may determine the one or more regions to be text region based on the removal of the one or more non-text regions in the binary image.

Figure 3C:
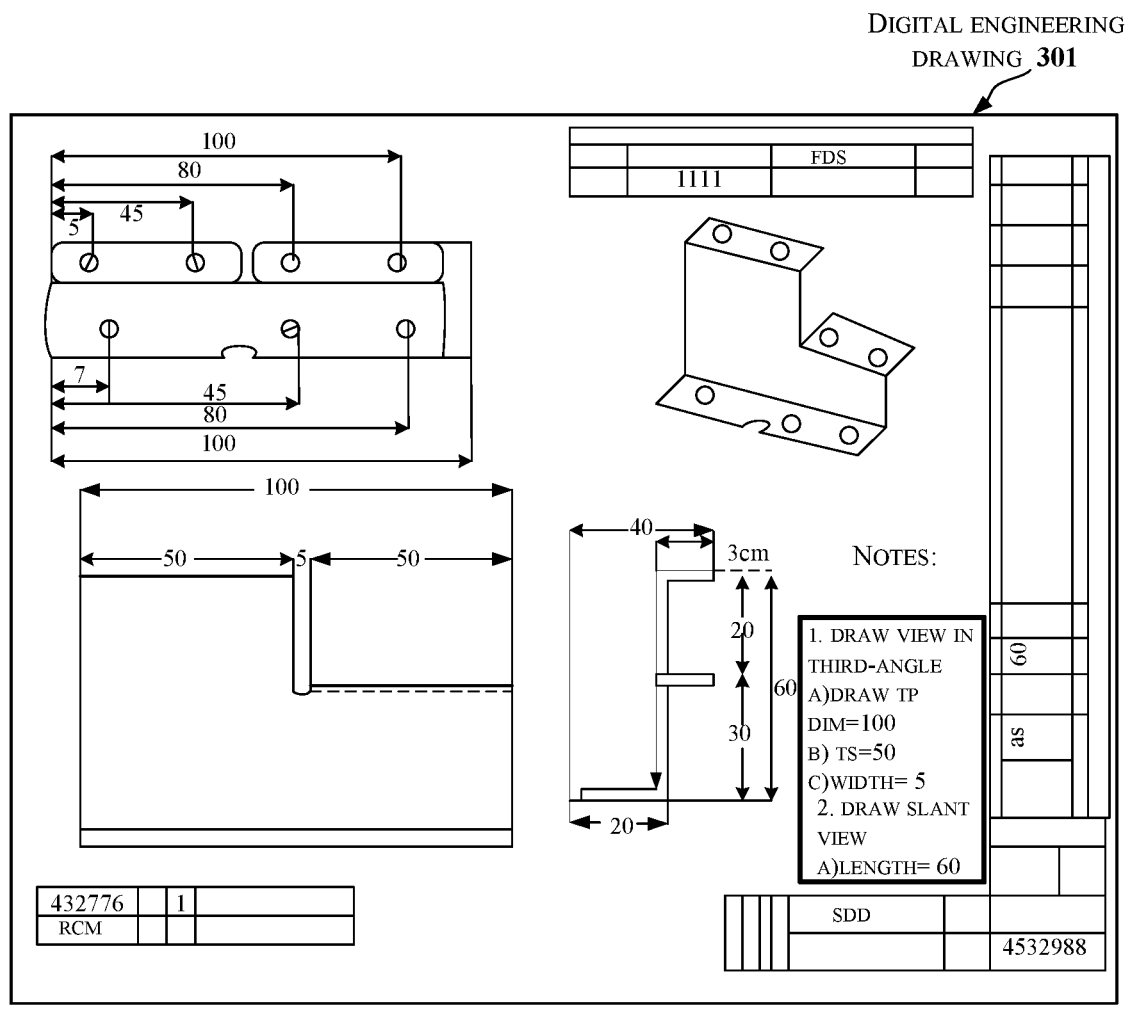
FIG. 3c shows an exemplary representation for detecting text in a digital engineering drawing in accordance with some embodiments of present disclosure.

The text region processing module 225 may process the one or more text regions to detect text in the engineering drawing. The text region processing module 225 converts the binary image to an eroded image using a morphological gradient and connected component analysis. Using the connected component analysis, the one or more image contours may be determined to find contours of black blobs and a threshold may be applied on the contour size to determine possible text or notes region in the binary image. Further, the text region processing module 225 may identify a block of text in the eroded image based on a predefined maximum height and maximum width, and a predefined minimum height and minimum width of image contours in the eroded image. In an embodiment, the identified block of text may be cropped from the binary image. Further, the text region processing module 225 may detect the text from the block of text using optical character recognition (OCR) technique. FIG. 3c shows an exemplary representation for detecting a text in a digital engineering drawing in accordance with some embodiments of present disclosure. As shown in FIG. 3c, the highlighted portion in the digital engineering drawing 301 represents the notes region in the engineering images, which comprises the text.

Figure 4:
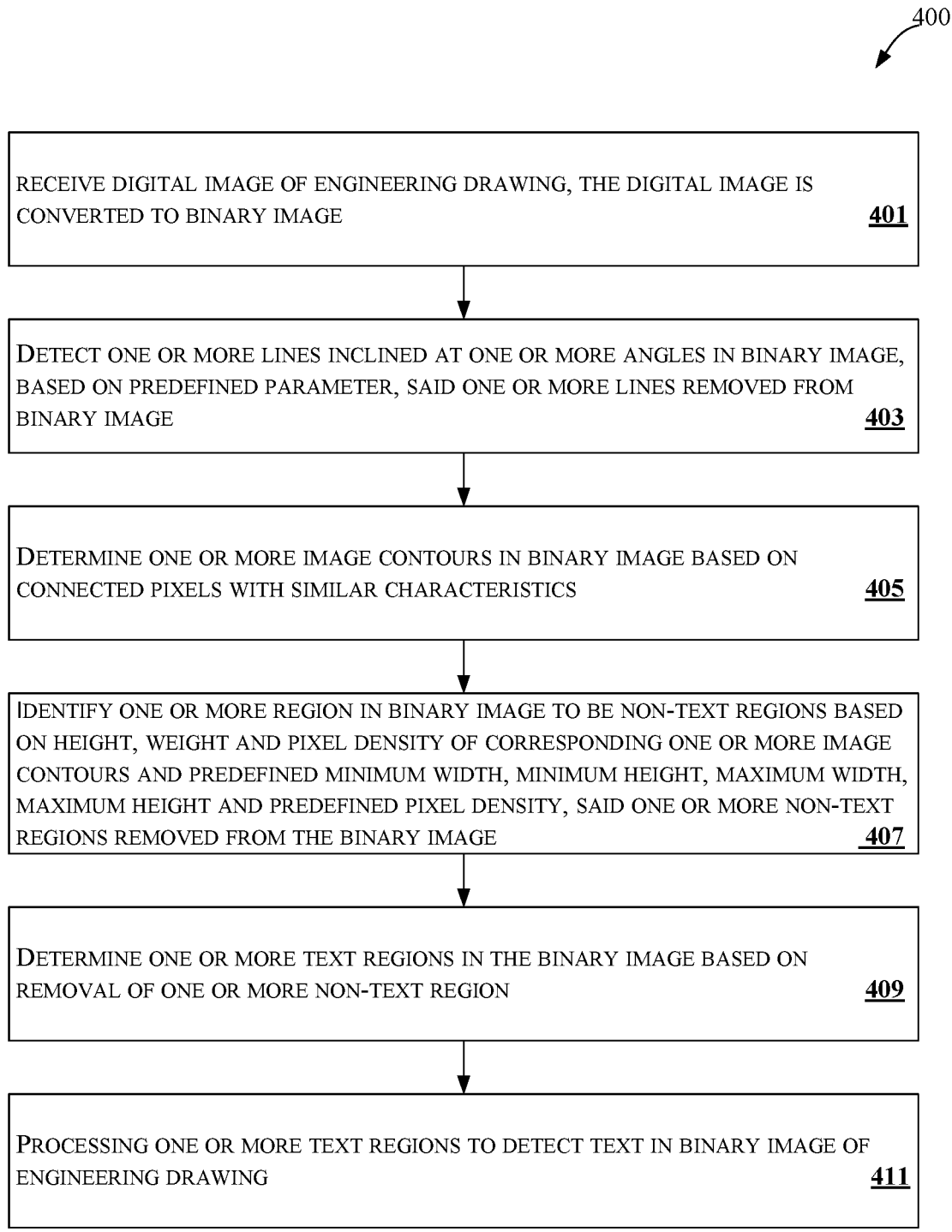
FIG. 4 illustrates a flowchart showing a method for detecting text in digital engineering drawings in accordance with some embodiments of present disclosure.

FIG. 4 illustrates a flowchart showing a method for detecting text in digital engineering drawings in accordance with some embodiments of present disclosure. As illustrated in FIG. 4, the method 400 includes one or more blocks for detecting text in digital engineering drawings. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the digital image of the engineering drawing may be received, by the receiving module 213. The digital image may be converted to a binary image by the digital image converter 215.

At block 403, the one or more lines inclined at one or more angles are detected, by the line detector module 217, in the binary image, based on the pre-defined parameters. The one or more lines may be removed from the binary image.

At block 405, the one or more image contours may be determined by the image contour determination module 219, in the binary image based on connected pixels with similar characteristics.

At block 407, the one or more regions in the binary image may be identified by the non-text region identification module 221, to be non-text regions based on the height, the width, and the pixel density, of corresponding one or more image contours and the predefined minimum height, minimum width, maximum height, maximum width, and the predefined pixel density. The one or more non-text regions are removed from the binary image.

At block 409, the one or more text regions in the binary image may be determined, by the text region determination module 223, based on the removal of the one or more non-text regions.

At block 411, the one or more text regions may be processed by the text region processing module 225 to detect text in the binary image of the engineering drawing.

Figure 5:
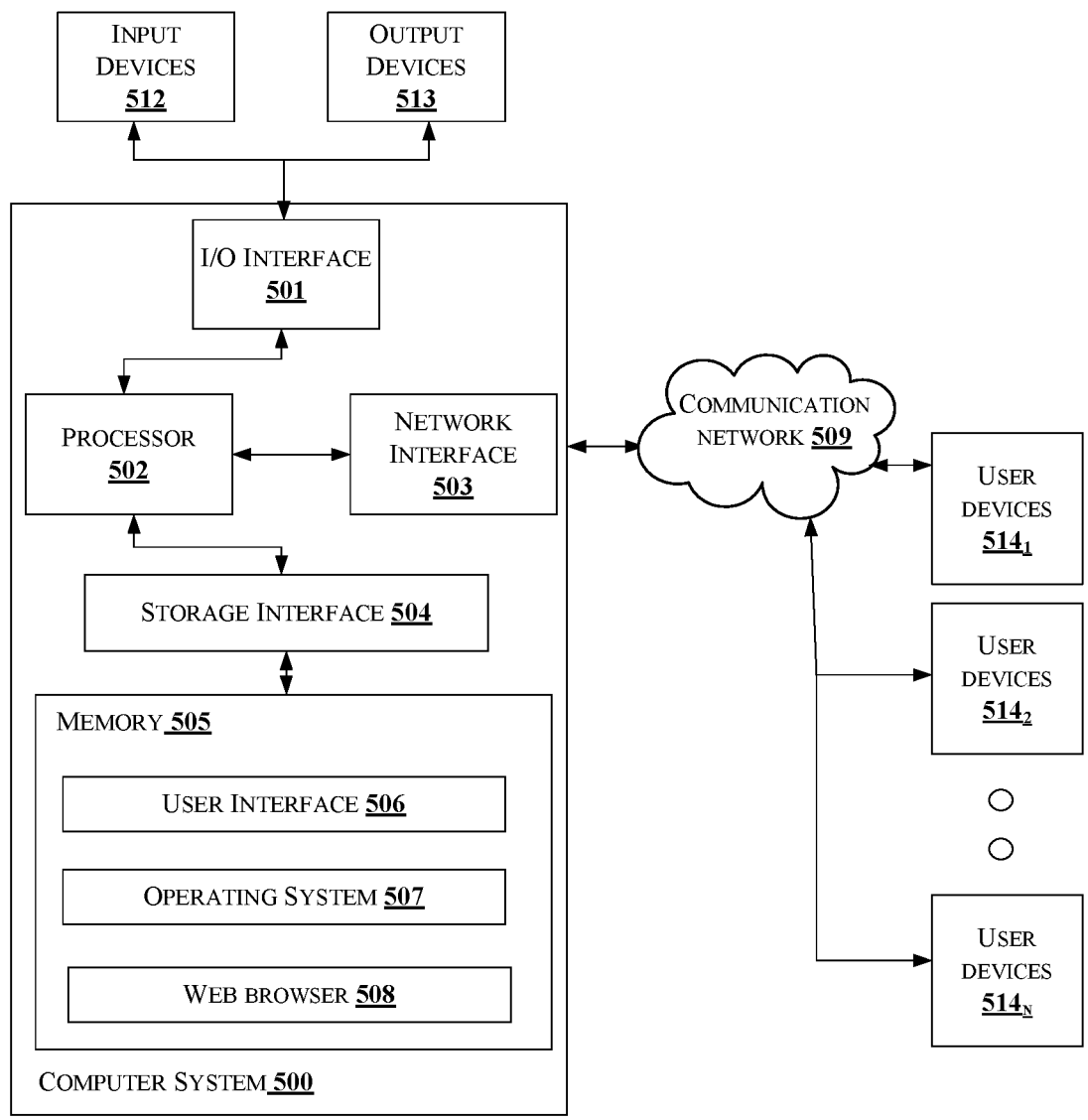
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the text detection system 101. The computer system 500 may include a central processing unit ("CPU" or "processor") 502. The processor 502 may include at least one data processor for detecting text in digital engineering drawings. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a text detection system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user device 5141, a user device 5142 . . . , a user device 514N. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure facilitates easy detection of lines inclined at any angle.

An embodiment of the present disclosure ensures easy text detection in complex engineering drawings.

An embodiment of the present disclosure ensures removal of special characters like dots, hyphen and other non-text component from digital engineering drawings easily.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of detecting text in digital engineering drawings, the method comprising:
receiving, by a text detection system, a digital image of an engineering drawing, wherein the digital image is converted to a binary image;

detecting, by the text detection system, one or more lines inclined at one or more angles, in the binary image, based on pre-defined parameters, wherein the one or more lines are removed from the binary image;

determining, by the text detection system, one or more image contours in the binary image based on connected pixels with similar characteristics;

identifying, by the text detection system, one or more regions in the binary image, to be non-text regions based on a height, a width, and a pixel density, of corresponding one or more image contours and a predefined minimum height, minimum width, maximum height, maximum width, and a predefined pixel density, wherein the one or more non-text regions are removed from the binary image, wherein the pixel density is a ratio of number of white pixels and product of contour width and height;

determining, by the text detection system, one or more text regions in the binary image based on the removal of the one or more non-text regions; and processing, by the text detection system, the one or more text regions to detect text in the binary image of the engineering drawing.

2. The method as claimed in claim 1, wherein the pre-defined parameters comprise distance resolution between two lines, angle resolution of lines passing through a point, number of votes for a line, and minimum length for the line.

3. The method as claimed in claim 1, wherein identifying the one or more regions to be non-text region comprises detecting the height of the one or more image contour corresponding to the one or more regions to be one of, greater than a predefined maximum height and lesser than a predefined minimum height, the width of the one or more image contours to be one of greater than a predefined maximum width and lesser than a predefined minimum width and the pixel density of the one or more image contours to be greater than the predefined pixel density.

4. The method as claimed in claim 1, wherein processing the one or more text regions comprises:
    converting, by the text detection system, the binary image to an eroded image using erosion and dilation technique;
    identifying, by the text detection system, a block of text in the eroded image based on a predefined maximum height and maximum width and a predefined minimum height and minimum width and a predefined pixel density of image contours in the eroded image; and
    detecting, by the text detection system, the text from the block of text using optical character recognition (OCR) technique.

5. A text detection system for detecting text in digital engineering drawings, comprising:
    a processor; and
    a memory communicatively coupled to the processor, wherein the memory stores processor instructions, which, on execution, causes the processor to:
        receive a digital image of an engineering drawing, wherein the digital image is converted to a binary image;
        detect one or more lines inclined at one or more angles, in the binary image, based on pre-defined parameters, wherein the one or more lines are removed from the binary image;
        determine one or more image contours in the binary image based on connected pixels with similar characteristics;
        identify one or more regions in the binary image, to be non-text regions based on a height, a width, and a pixel density, of corresponding one or more image contours and a predefined minimum height, minimum width, maximum height, maximum width, and a predefined pixel density, wherein the one or more non-text regions are removed from the binary image, wherein the pixel density is a ratio of number of white pixels and product of contour width and height;
        determine one or more text regions in the binary image based on the removal of the one or more non-text regions; and
        process the one or more text regions to detect text in the binary image of the engineering drawing.

6. The text detection system as claimed in claim 5, wherein the pre-defined parameters comprise distance resolution between two lines, angle resolution of lines passing through a point, number of votes for a line, and minimum length for the line.

7. The text detection system as claimed in claim 5, wherein the processor identifies the one or more regions to be non-text region by detecting the height of the one or more image contour corresponding to the one or more regions to be one of, greater than a predefined maximum height and lesser than a predefined minimum height, the width of the one or more image contours to be one of greater than a predefined maximum width and lesser than a predefined minimum width and the pixel density of the one or more image contours to be greater than the predefined pixel density.

8. The text detection system as claimed in claim 5, wherein the processor processes the one or more text regions by:
    converting the binary image to an eroded image using erosion and dilation technique;
    identifying a block of text in the eroded image based on a predefined maximum height and maximum width, a predefined minimum height and minimum width and a predefined pixel density of image contours in the eroded image; and
    detecting the text from the block of text using optical Character Recognition (OCR) technique.

9. A non-transitory computer readable medium including instructions stored thereon that when processed by at least one processor cause a text detection system to perform operations comprising:
    receiving a digital image of an engineering drawing, wherein the digital image is converted to a binary image;
    detecting one or more lines inclined at one or more angles, in the binary image, based on pre-defined parameters, wherein the one or more lines are removed from the binary image;
    determining one or more image contours in the binary image based on connected pixels with similar characteristics;
    identifying one or more regions in the binary image, to be non-text regions based on a height, a width, and a pixel density, of corresponding one or more image contours and a predefined minimum height, minimum width, maximum height, maximum width, and a predefined pixel density, wherein the one or more non-text regions are removed from the binary image, wherein the pixel density is a ratio of number of white pixels and product of contour width and height;

determining one or more text regions in the binary image based on the removal of the one or more non-text regions; and processing the one or more text regions to detect text in the binary image of the engineering drawing.

10. The medium as claimed in claim 9, wherein the pre-defined parameters comprise distance resolution between two lines, angle resolution of lines passing through a point, number of votes for a line, and minimum length for the line.

11. The medium as claimed in claim 9, wherein the instruction causes the processor to identify the one or more regions to be non-text region by detecting the height of the one or more image contour corresponding to the one or more regions to be one of, greater than a predefined maximum height and lesser than a predefined minimum height, the width of the one or more image contours to be one of greater than a predefined maximum width and lesser than a predefined minimum width and the pixel density of the one or more image contours to be greater than the predefined pixel density.

12. The medium as claimed in claim 9, wherein the instruction causes the processor to process the one or more text regions by:

converting the binary image to an eroded image using erosion and dilation technique;

identifying a block of text in the eroded image based on a predefined maximum height and maximum width, a predefined minimum height and minimum width and a predefined pixel density of image contours in the eroded image; and detecting the text from the block of text using optical character recognition (OCR) technique.

\* \* \* \* \*